UNITED STATES PATENT OFFICE.

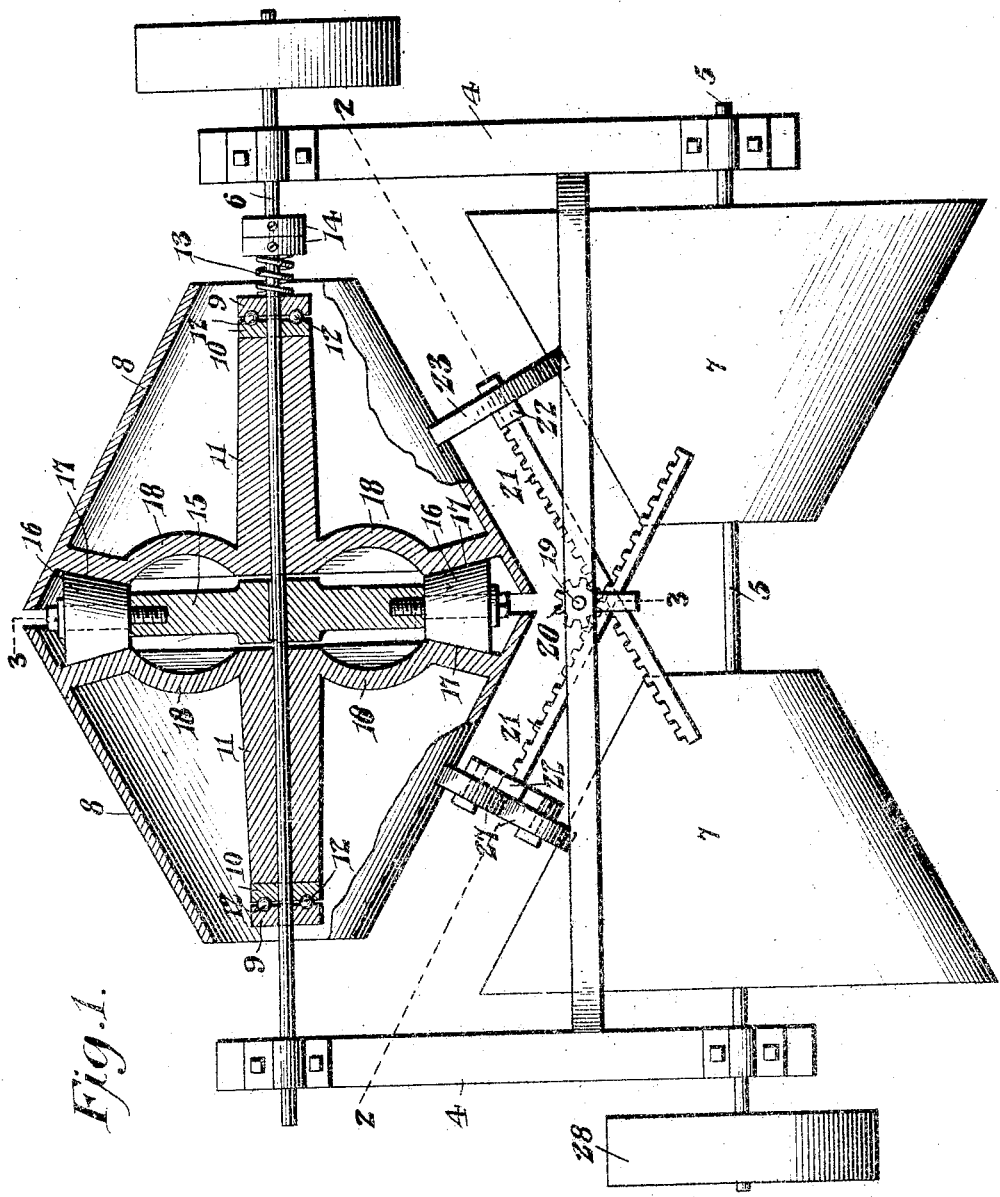

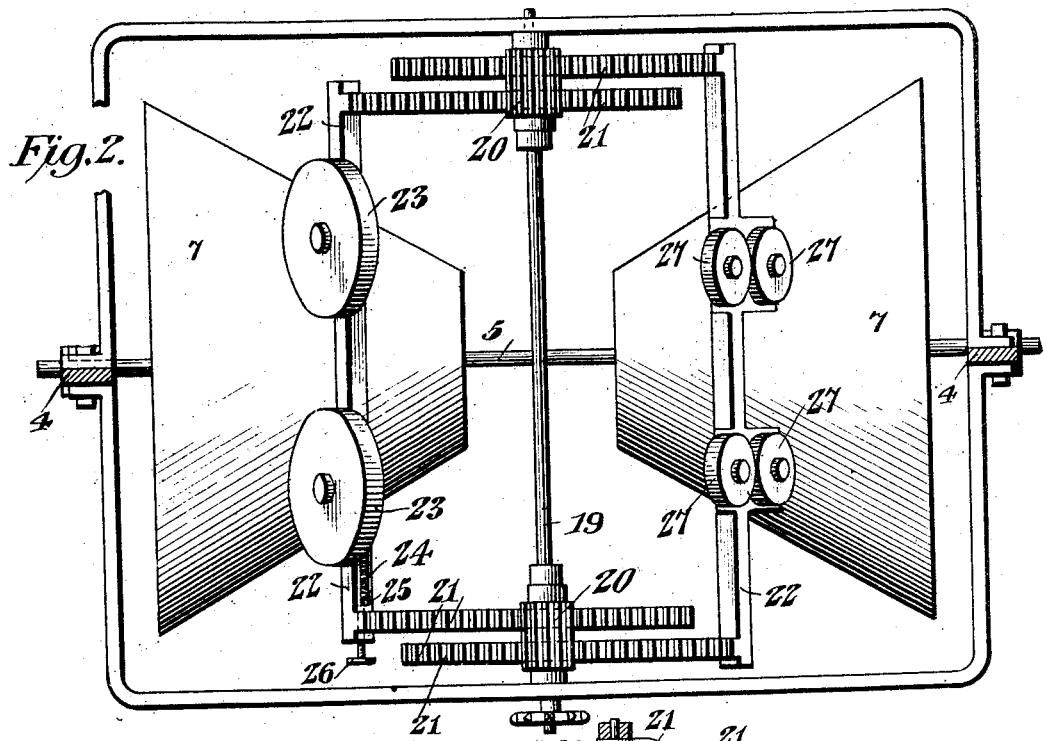
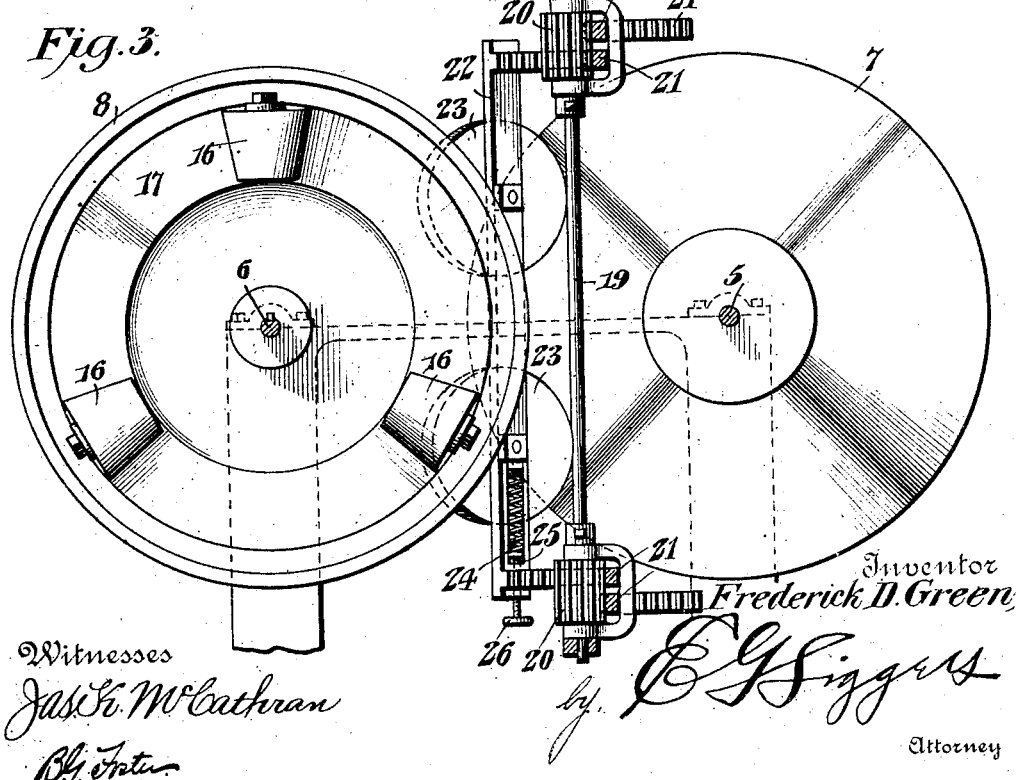

FREDERICK D. GREEN, OF FLORENCE, ALABAMA.

VARIABLE-SPEED GEARING.

No. 877,765.  Specification of Letters Patent.  Patented Jan. 28, 1908.

Application filed July 31, 1906. Serial No. 328,603.

*To all whom it may concern:*

Be it known that I, FREDERICK D. GREEN, a citizen of the United States, residing at Florence, in the county of Lauderdale and State of Alabama, have invented a new and useful Variable-Speed Gearing, of which the following is a specification.

This invention relates to mechanism, whereby a driven member can be driven at varying rates of speed, and the direction of its movement reversed.

The principal object is to provide novel means of a simple nature that can be employed in various machines and mechanisms, and is so constructed that the reverse operations of a driven member can be readily controlled, while the speed thereof in either direction is easily alterable from the slowest to the highest rates and vice versa, without imparting shocks or jars to the mechanism.

The preferred, but not the only embodiment of the invention is illustrated in the accompanying drawings, wherein:—

Figure 1 is a top plan view of the structure, certain portions thereof being shown in section. Fig. 2 is a sectional view on the line 2—2 of Fig. 1. Fig. 3 is a sectional view on the line 3—3 of Fig. 1.

Similar reference numerals designate corresponding parts in all the figures of the drawings.

In the embodiment illustrated, a suitable frame 4 is employed, on which is journaled a drving shaft 5, and a driven shaft 6. The driving shaft 5 has secured thereto relatively fixed, inwardly tapering cone elements 7. The driven shaft 6 has outwardly tapered cone elements 8 loosely journaled thereon, these cone elements being relatively rotatable in opposite directions. The adjacent portions of the cone surfaces of the respective elements 7 and 8 are disposed in substantially parallel relation. The cone elements 8 are preferably provided with outer thrust bearings, consisting of abutment collars 9, one of which is fixed to the shaft, the other being slidable thereupon. Other collars 10 are carried by the hub 11 of the cone 8, and are disposed in opposing relation to the collars 9, balls 12 being interposed between them. The sliding collar 9 is borne against by a coiled spring 13, mounted on the driven shaft 6, and having its outer end abutted against a suitable tension collar 14.

Secured to the driven shaft 6, between the cones 8 is a carrier 15, and on the same are journaled planetary friction gears 16, that are beveled as shown in Fig. 1, and have their diametrically opposite portions in frictional engagement with the opposing surfaces 17 of webs 18, constituting connections between the cones 8 and the hubs 11, the proper frictional engagement being insured by the spring 13, as will be evident.

Journaled between the sets of cones is a controlling shaft 19 that may be rotated by any suitable means, and is provided with pinions 20, located on opposite sides of the plane in which the axes of rotation of the shafts 5 and 6 are disposed. Oppositely disposed racks 21 are in engagement with the pinions 20, and have their outer ends connected by cross bars 22 that pass between the opposing faces of the cones 7 and 8. On one of the cross bars are journaled friction gears 23 that have their opposite portions engaging the cone surfaces of the elements 7 and 8. One of the gears 23 is slidable longitudinally of the bar 22, carrying it, and is urged towards the other by a spring 24, located in a slot 25 in which the journal of the gear is slidably engaged. A tensioning screw 26, threaded into one end of the cross bar, engages the rear end of the spring, and constitutes an abutment therefor. On the other cross bar 22, are journaled sets of friction wheels 27, the wheels of each set being in frictional engagement with each other and having their outer portions respectively in engagement with the cone surfaces of the other set of cones.

The operation of the mechanism may be briefly outlined as follows. If power is applied to the driving shaft 5 in any suitable manner, as for instance, through the medium of a pulley 28, it will be evident that the cones 7 will be rotated. If now, the controlling shaft 19 is turned, so that the wheels 23 and 27 are positioned centrally of the cones 7 and 8, it will be evident that the cones 8 will be rotated at the same speed, but in opposite directions, the planetary gearing 16 will therefore rotate, but will not revolve around the driven shaft, or in other words, the carrier 15, and consequently the driven shaft 6 will remain stationary. If now, the controlling shaft 19 is turned, so that the racks 21 will be moved to carry the single friction gears 23 towards the smaller end of their cone 8, and the double gears 27 towards the larger end of the other cone 8, it will be evident that the speed of one cone will be increased while that of the other will be reduced. This difference in rotation will effect not only the rotation of the planet 16, but the revolution around the shaft 6, and consequently said shaft will be revolved. The nearer the friction gears approach the ends of the cones, the more rapid will be the speed of the driven member, and in like manner, the closer the gears approach the center of the cones, the slower will be the speed of the driving member. To reverse the direction of rotation of the driven shaft 6, it is only necessary to turn the controlling shaft 19 so that the single friction gears 23 will be carried towards the larger end of their driven cone 8, and the double friction gears 27 correspondingly carried towards the smaller end of their driven cone. Then inasmuch as the speed of the cone 8 engaged by the gears 23 will be reduced, and the speed of the other cone 8 will be increased, the planetary gearing 15 will be caused to revolve in an opposite direction. It will be evident that this structure is very simple, and that the driven member may be slowly brought to a standstill, or slowly thrown into operation in either direction without regard to the speed of the driving member. Also that the speed of said driven member in either direction, may be gradually increased to the highest rate attainable without in any manner altering or affecting the speed of the driving member.

From the foregoing, it is thought that the construction, operation, and many advantages of the herein described invention, will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:

1. In gearing of the character described, the combination with a single driven shaft, of opposite cone elements loosely journaled thereon, a planetary gear fixed to the shaft and interposed between the cone elements, said gear being engaged therewith, means for yieldingly urging one of the cone elements toward the other to insure such engagement, and means operating against the cone elements for rotating them at different rates of speed.

2. In gearing of the character described, the combination with relatively rotatable cone elements, of planetary gearing associated with both elements, oppositely rotating gears engaging and adjustable along the cone surfaces of the elements to effect their relative rotation at different speeds.

3. In gearing of the character described, the combination with relatively rotatable cone elements, of planetary gearing associated with both elements, friction gears adjustable along the cone surfaces of the elements to effect their relative rotation at different speeds, and means for rotating the gears and thereby the elements in opposite directions.

4. In gearing of the character described, the combination with rotatable oppositely disposed cone elements arranged end to end, of a revoluble planetary gear located between and having a rotatable engagement with the adjacent ends of the elements, and friction gears adjustable in opposite directions along the cone surfaces of the elements to effect their relative rotation.

5. In gearing of the character described, the combination with a driven shaft, of a carrier fixed to the shaft, oppositely disposed cone elements loosely journaled on the shaft on opposite sides of the carrier, a planetary gear journaled on the carrier and engaging the adjacent ends of the cone elements, friction gears engaging the cone surfaces of the elements, and adjustable longitudinally along the same, and means for effecting the adjustment of the friction gears.

6. In gearing of the character described, the combination with rotatable oppositely disposed driven cone elements, arranged end to end, of a revoluble planetary gear located between them and having a rotatable engagement with the adjacent ends thereof, a driving member comprising oppositely disposed cone elements, and friction gearing interposed between the corresponding driving and driven cone elements.

7. In gearing of the character described, the combination with rotatable oppositely disposed driven cone elements, arranged end to end, of a revoluble planetary gear located between them and having a rotatable engagement with the adjacent ends thereof, a driving member comprising oppositely disposed cone elements, a controlling shaft having pinions, racks engaged with the pinions, and movable longitudinally of the cone surfaces of the elements, and friction gears secured to the said racks and operating against the adjacent friction surfaces of the opposed elements.

8. In gearing of the character described, the combination with relatively rotatable driven cone elements, of relatively fixed driving cone elements disposed in opposing relation to the driven cone elements, gearing interposed between one of the driving cone elements and the opposed driven cone element for rotating the latter in one direction, and gearing interposed between the other driving cone element and the opposed driven cone element for rotating the latter in an opposite direction.

9. In gearing of the character described, the combination with a gear, of oppositely disposed, oppositely rotatable driven cone elements, a pair of relatively fixed, oppositely disposed driving cone elements, the surfaces of the driving cone elements being disposed substantially parallel to the surfaces of the driven cone elements, gearing engaging the parallel surfaces and adjustable longitudinally along the same, said gearing rotating one of the driven cone elements in one direction and the other in an opposite direction, and means for effecting the movement of the gearing longitudinally of the surfaces engaged thereby.

10. In gearing of the character described, the combination with a driven shaft, of outwardly tapered cones loosely journaled on the driven shaft, a carrier fixed to the driven shaft between the cones, planetary gearing journaled upon the carrier and engaging the adjacent end portions of said cones, a driving shaft, inwardly tapering cones fixed to the driving shaft, gear wheels interposed between the inwardly tapering and outwardly tapering cones and engaging the same, and means for effecting the movement of the gear wheels towards and from each other.

11. In gearing of the character described, the combination with a driven shaft, of a carrier fixed thereto, outwardly tapered cones loosely journaled on the shaft on opposite sides of the carrier, friction gears journaled on the carrier and engaging the adjacent ends of the cones, means for yieldingly urging the cones towards each other, a driving shaft, inwardly tapered cones fixed to the driving shaft and having portions of their cone surfaces substantially parallel to the adjacent portions of the outwardly tapered cones, a controlling shaft located between the cones and having pinions, racks engaged with said pinions, a friction gear wheel connected to one rack and having its opposite portions engaging the opposed surfaces of one outwardly tapered and one inwardly tapered cone, and a pair of friction wheels carried by the other rack and in frictional engagement, the outer sides of said friction wheels being engaged with the other outwardly tapered and inwardly tapered cones.

In testimony, that I claim the foregoing as my own, I have hereto affixed my signature in the presence of two witnesses.

FREDERICK D. GREEN

Witnesses:
  E. E. ELDER,
  C. S. JORDEN.